United States Patent
Jacobine et al.

(10) Patent No.: US 6,844,376 B1
(45) Date of Patent: Jan. 18, 2005

(54) POLYURETHANE COMPOSITIONS CONTAINING BOTH RADIATION AND MOISTURE CURABLE GROUPS

(75) Inventors: Anthony Francis Jacobine, Meriden, CT (US); Steven Thomas Nakos, Andover, CT (US); Peter Albert Salamon, Hebron, CT (US); Hsien-Kun Chu, Wethersfield, CT (US)

(73) Assignee: Henkel Corporation, Rocky Hill, CT (US)

( * ) Notice: Subject to any disclaimer, the term of this patent is extended or adjusted under 35 U.S.C. 154(b) by 5 days.

(21) Appl. No.: 10/630,726

(22) Filed: Jul. 31, 2003

Related U.S. Application Data

(60) Provisional application No. 60/420,547, filed on Oct. 23, 2002.

(51) Int. Cl.$^7$ .................................................. C08F 2/46
(52) U.S. Cl. ..................... 522/172; 522/174; 522/90; 522/91; 522/99; 522/148; 522/151; 522/152; 522/173; 528/25; 528/26; 428/411.1; 428/423.1; 428/446; 428/447; 427/487; 427/508; 427/496; 427/515
(58) Field of Search .............................. 522/90, 91, 99, 522/148, 151, 152, 172, 174, 173; 428/411.1, 423.1, 446, 447; 427/487, 508, 496, 515; 528/25, 26

(56) References Cited

U.S. PATENT DOCUMENTS

| | | | |
|---|---|---|---|
| 4,528,081 A | | 7/1985 | Lien et al. ............. 204/159.13 |
| 4,640,868 A | * | 2/1987 | Penn ........................... 428/446 |
| 4,699,802 A | | 10/1987 | Nakos et al. ............... 427/54.1 |
| 5,233,006 A | * | 8/1993 | Wolter et al. .................. 528/32 |
| 5,243,012 A | | 9/1993 | Wicks et al. ................... 528/58 |
| 5,384,340 A | * | 1/1995 | Hara et al. ..................... 522/99 |
| 5,426,132 A | * | 6/1995 | Gaglani ....................... 522/148 |
| 5,466,771 A | | 11/1995 | Hicks et al. ................... 528/64 |
| 5,663,269 A | | 9/1997 | Chu et al. ....................... 528/14 |
| 5,696,179 A | * | 12/1997 | Chawla ........................ 522/90 |
| 6,096,823 A | * | 8/2000 | Shaffer ........................ 524/590 |
| 6,140,444 A | | 10/2000 | Levandoski et al. .......... 528/14 |
| 6,271,333 B1 | * | 8/2001 | Okuhira ........................ 528/28 |

* cited by examiner

Primary Examiner—James J. Seidleck
Assistant Examiner—Sanza L McClendon
(74) Attorney, Agent, or Firm—Steven C. Bauman

(57) ABSTRACT

The invention provides a reaction product derived from an epoxy-functional acrylic monomer and an alkylaminoalkylene polyalkoxysilane or from a reaction product derived from acrylic acid and an epoxidized polyalkoxysilane.

25 Claims, No Drawings

POLYURETHANE COMPOSITIONS CONTAINING BOTH RADIATION AND MOISTURE CURABLE GROUPS

This application claims the benefit of Provisional Ser. No. 60/420,547 filed on Oct. 23, 2002.

FIELD OF THE INVENTION

The present invention relates to moisture and radiation curable compositions and methods for the preparation thereof. More particularly, this invention relates to polyurethane polymers capped with a reaction product derived from an epoxy-functional acrylic monomer and an alkylaminoalkylene polyalkoxysilane or capped with a reaction product derived from a (meth)acrylic acid or a derivative thereof and an epoxidized polyalkoxysilane.

BRIEF DESCRIPTION OF RELATED TECHNOLOGY

Polyurethanes comprise a family of polymers having wide ranging properties and uses, all based on the reaction of organic polyisocyanates with polyols (polymers containing more than one hydroxyl group). Compositions of polyurethanes have excellent adhesion to a variety of substrates, and they are particularly useful in potting and coating applications and as structural adhesives.

Polyurethanes may be cured (i.e. the setting up of chemical links between the molecular chains of a resin to form a three-dimensional network polymer system), by heat, moisture, or ultraviolet ("UV") light exposure. Each of these methods has its own set of advantages and disadvantages. Heat cure improves wetting and lowers viscosity. However, for truly rapid curing, temperatures in excess of 150° C. are typically used. Such high temperatures can, for example, damage components on circuit boards. Moisture curing tends to be slow, requiring cure times of 24 hours or more before a full cure can be achieved. Curing by UV exposure has the advantage of fast cure speed, but the disadvantage of not curing in shadowed areas.

To overcome some of these problems, dual curable mechanisms, such as those that enable both radiation (e.g., UV) and moisture curing, have been formulated into some polymer compositions. Radiation and moisture curing chemistry, however, has been engineered primarily into silicone rather than polyurethane based compositions. For example, such dual curing silicone compositions have been disclosed in U.S. Pat. No. 5,663,269 (Chu); U.S. Pat. No. 6,140,444 (Levandoski); U.S. Pat. No. 4,528,081 (Lien) and U.S. Pat. No. 4,699,802 (Nakos).

Conventional silicone compositions however, may not be as useful as polyurethanes for applications involving structural adhesives. Additionally, dual curing polyurethanes may be particularly useful where the substrate has shadow areas that are not readily accessible to direct UV light and require moisture cure for cross-linking of those areas.

Accordingly, it is desirable to have a polyurethane composition that is capable of curing by both moisture and UV mechanisms.

SUMMARY OF THE INVENTION

In one aspect of the present invention there is provided a radiation and moisture curable composition including (a) a compound with the structural formula I:

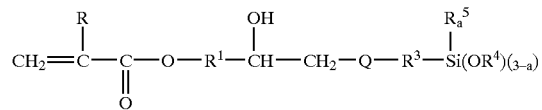

where R is H or a monovalent substituted or unsubstituted $C_{1-6}$ hydrocarbon radical;

Q is S, O or $N(R^2)$;

$R^1$ is a divalent substituted or unsubstituted $C_{1-12}$ aliphatic, cycloaliphatic or aromatic hydrocarbon radical, which may be interrupted with a heteroatom-containing linkage;

$R^2$ is H or a monovalent substituted or unsubstituted $C_{1-6}$ hydrocarbon radical;

$R^3$ is a divalent substituted or unsubstituted $C_{1-20}$ aliphatic, cycloaliphatic or aromatic hydrocarbon radical, which may be interrupted with a heteroatom-containing linkage;

$R^4$ and $R^5$ may each independently be a monovalent substituted or unsubstituted $C_{1-6}$ hydrocarbon radical; and a is 0 or 1; and (b) a diisocyanate.

In another aspect of the present invention there is provided a composition including the reaction product of: (a) a compound with the structural formula I:

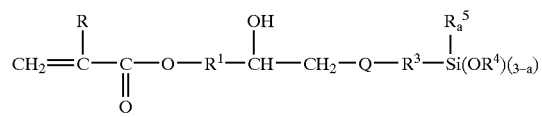

where R is H or a monovalent substituted or unsubstituted C, hydrocarbon radical;

Q is S, O or $N(R^2)$;

$R^1$ is a divalent substituted or unsubstituted $C_{1-12}$ aliphatic; cycloaliphatic or aromatic hydrocarbon radical, which may be interrupted with a heteroatom-containing linkage;

$R^2$ is H or a monovalent substituted or unsubstituted $C_{1-6}$ hydrocarbon radical;

$R^3$ is a divalent substituted or unsubstituted $C_{1-20}$ aliphatic, cycloaliphatic or aromatic hydrocarbon radical, which may be interrupted with a heteroatom containing linkage;

$R^4$ and $R^5$ may each independently be a monovalent substituted or unsubstituted $C_{1-6}$ hydrocarbon radical; and a is 0 or 1; and (b) a diisocyanate.

In still a further aspect of the invention there is included a composition which includes the reaction product of (i) the reaction product of an epoxidized (methacrylate and an alkylaminoalkylene polyalkoxysilane; and (ii) a diisocyanate.

In yet another aspect of the invention, there is provided a composition including the reaction product of: (i) the reaction product of (meth)acrylic acid and epoxidized polyalkoxysilane; and (ii) a diisocyanate.

A further aspect of the present invention provides a method of producing a radiation and moisture curable composition including: (a) providing a compound with the structural formula I:

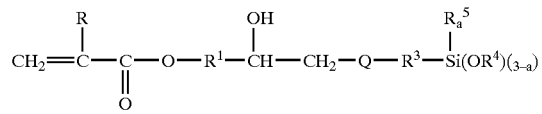

where R is H or a monovalent substituted or unsubstituted $C_{1-6}$ hydrocarbon radical;

Q is S, O or $N(R^2)$;

$R^1$ is a divalent substituted or unsubstituted $C_{1-12}$ aliphatic, cycloaliphatic or aromatic hydrocarbon radical, which may be interrupted with a heteroatom-containing linkage;

$R^2$ is H or a monovalent substituted or unsubstituted $C_{1-6}$ hydrocarbon radical;

$R^3$ is a divalent substituted or unsubstituted $C_{1-20}$ aliphatic, cycloaliphatic or aromatic hydrocarbon radical, which may be interrupted with a heteroatom-containing linkage;

$R^4$ is a monovalent substituted or unsubstituted $C_{1-6}$ hydrocarbon radical; and (b) reacting the compound with a diisocyanate.

The present invention also includes a method of preparing a radiation and moisture curable composition which includes admixing the compound of formula I with a diisocyanate.

Further provided is a method of using a composition having a reaction product of:

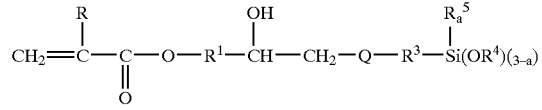

where R is H or a monovalent substituted or unsubstituted $C_{1-6}$ hydrocarbon radical;

Q is S, O or $N(R^2)$;

$R^1$ is a divalent substituted or unsubstituted $C_{1-12}$ aliphatic, cycloaliphatic or aromatic hydrocarbon radical, which may be interrupted with a heteroatom-containing linkage;

$R^2$ is H or a monovalent substituted or unsubstituted $C_{1-6}$ hydrocarbon radical;

$R^3$ is a divalent substituted or unsubstituted $C_{1-20}$ aliphatic, cycloaliphatic or aromatic hydrocarbon radical, which may be interrupted with a heteroatom-containing linkage;

$R^4$ is a monovalent substituted or unsubstituted $C_{1-6}$ hydrocarbon radical;

and a diisocyanate, said method comprising the steps of applying the composition onto a surface of a substrate; and subjecting the composition-applied substrate to a curing mechanism to produce the reaction product.

In another aspect of the invention is provided a method of forming a bond including the steps of applying a composition having the reaction product of:

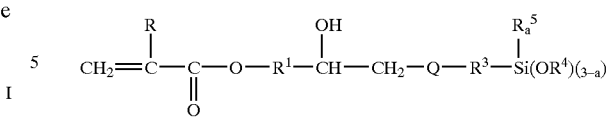

where R is H or a monovalent substituted or unsubstituted $C_{1-6}$ hydrocarbon radical, Q is S, or $N(R^2)$;

$R^1$ is a divalent substituted or unsubstituted $C_{1-12}$ aliphatic, cycloaliphatic or aromatic hydrocarbon radical, which may be interrupted with a heteroatom-containing linkage;

$R^2$ is H or a monovalent substituted or unsubstituted $C_{1-6}$ hydrocarbon radical $R^3$ is a divalent substituted or unsubstituted $C_{1-20}$ aliphatic, cycloaliphatic or aromatic hydrocarbon radical, which may be interrupted with a heteroatom-containing linkage;

$R^4$ is a monovalent substituted or unsubstituted $C_{1-6}$ hydrocarbon radical and a diisocyanate onto a surface of a substrate; and subjecting said composition to conditions suitable to effectuate cure.

Furthermore, provided herein is a bond having a cured composition, wherein said cured composition includes the reaction product of:

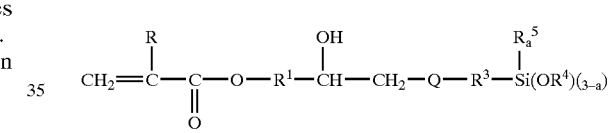

where R is H or a monovalent substituted or unsubstituted $C_{1-6}$ hydrocarbon radical;

Q is S, or $N(R^2)$;

$R^1$ is a divalent substituted or unsubstituted $C_{1-12}$ aliphatic, cycloaliphatic or aromatic hydrocarbon radical, which may be interrupted with a heteroatom-containing linkage;

$R^2$ is H or a monovalent substituted or unsubstituted $C_{1-6}$ hydrocarbon radical;

$R^3$ is a divalent substituted or unsubstituted $C_{1-20}$ aliphatic, cycloaliphatic or aromatic hydrocarbon radical, which may be interrupted with a heteroatom-containing linkage;

$R^4$ is a monovalent substituted or unsubstituted $C_{1-6}$ hydrocarbon radical and a diisocyanate.

Also provided herein is an assembly including a composition having the reaction product of:

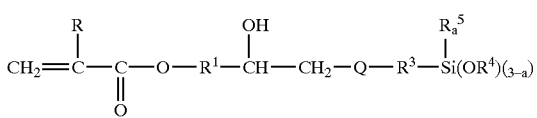

where R is H or a monovalent substituted or unsubstituted $C_{1-6}$ hydrocarbon radical;

Q is S, O or $N(R^2)$;

$R^1$ is a divalent substituted or unsubstituted $C_{1-12}$ aliphatic, cycloaliphatic or aromatic hydrocarbon radical, which may be interrupted with a heteroatom-containing linkage;

$R^2$ is H or a monovalent substituted or unsubstituted $C_{1-6}$ hydrocarbon radical;

$R^3$ is a divalent substituted or unsubstituted $C_{1-20}$ aliphatic, cycloaliphatic or aromatic hydrocarbon radical, which may be interrupted with a heteroatom-containing linkage;

$R^4$ is a monovalent substituted or unsubstituted $C_{1-6}$ hydrocarbon radical, and a diisocyanate, said composition being disposed to form a mated assembly.

DETAILED DESCRIPTION OF PREFERRED EMBODIMENTS

The radiation and moisture curing composition of the invention includes a compound according to structural formula I as depicted herein and a diisocyanate as described herein.

In another embodiment, the composition is formed as a reaction product of structural formula I and a diisocyanate.

Structural formula I contains an isocyanate-reactive group (e.g. an OH group), as well as acrylate and alkoxysilyl groups that provide the compositions with radiation and moisture curable function, respectively.

Structural formula I has the following formula:

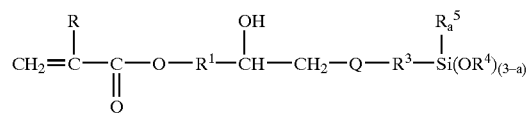

where R is H or a monovalent substituted or unsubstituted $C_{1-6}$ hydrocarbon radical;

Q is S, or $N(R^2)$;

$R^1$ is a divalent substituted or unsubstituted $C_{1-12}$ aliphatic, cycloaliphatic or aromatic hydrocarbon radical, which may be interrupted with a heteroatom-containing linkage;

$R^2$ is H or a monovalent substituted or unsubstituted $C_{1-6}$ hydrocarbon radical;

$R^3$ is a divalent substituted or unsubstituted $C_{1-20}$ aliphatic, cycloaliphatic or aromatic hydrocarbon radical, which may be interrupted with a heteroatom-containing linkage;

$R^4$ and $R^5$ may each independently be a monovalent substituted or unsubstituted $C_{1-6}$ hydrocarbon radical; and a is 0 or 1.

Desirably, $R^1$ is methylene or a methylenoxy alkylene $C_{1-6}$ linkage.

More desirably, $R^1$ is methyl, Q is oxygen, $R^3$ is propylene, and $R^4$ is methyl.

Even more desirably, $R^1$ is methyl, Q is $NR^2$, $R^2$ is ethyl, $R^3$ is propylene and $R^4$ is methyl.

Structural formula I may be formed by reacting an epoxy-functional acrylic monomer with a suitable alkylaminoalkylene polyalkoxysilane or a suitable mercaptofunctionalized alkylene polyalkoxysilane. This is exemplified by the following reaction scheme:

EQ. 1

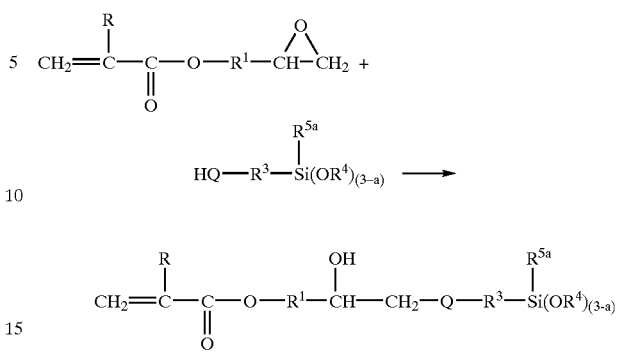

where R is H or a monovalent substituted or unsubstituted $C_{1-6}$ hydrocarbon radical; $R^1$ is an alkylene linkage $C_{1-12}$ which may be interrupted with a heteroatom; Q is S or $NR^2$; $R^2$ is H or a monovalent substituted or unsubstituted $C_{1-6}$ hydrocarbon radical; $R^3$ is a divalent substituted or unsubstituted $C_{1-20}$ aliphatic, cycloaliphatic or aromatic hydrocarbon radical, which may be interrupted with a heteroatom-containing linkage; and $R^4$ and $R^5$ may each independently be a monovalent substituted or unsubstituted $C_{1-6}$ hydrocarbon radical; and a is 0 or 1.

Epoxy-functional acrylic monomers for use in the present invention, include both acrylates and methacrylates. The term "(meth)acrylate" is used to refer to both acrylates and methacrylates. Examples of these monomers include, but are not limited to, those containing 1,2-epoxy groups such as glycidylacrylate and glycidyl methacrylate. Methacrylates such as glycidyl methacrylate are particularly desirable.

Examples of suitable alkylaminoalkylene polyalkoxysilane containing secondary amino groups useful for reacting with the epoxy-functional acrylic monomer include, but are not limited to, N-phenylaminopropyltrimethoxysilane (available as A-9669 from OSi Specialties, Witco), bis-(gamma-trimethoxysilylpropyl)amine (available as A-1170 from OSi Specialties, Witco), N-butylaminopropyltrimethoxysilane (available as Dynasilan 1189 from Degussa), N-cyclohexylaminopropyltriethoxy-silane, N-methylaminopropyltrimethoxysilane, and the corresponding alkyl diethyoxy and dimethoxy silanes. Desirably, ethylaminoisobutyltrimethoxysilane (available as A-Link 15 from OSi Specialties) is used.

Furthermore, the invention provides a moisture and radiation curable composition that includes the reaction product of an epoxy-functional acrylic monomer with a suitable alkylaminoalkylene polyalkoxysilane (as described above) and a diisocyanate as described below.

In another desired embodiment, structural formula I is formed by reacting an acid with an epoxidized polyalkoxysilane as exemplified in the following scheme:

EQ. 2

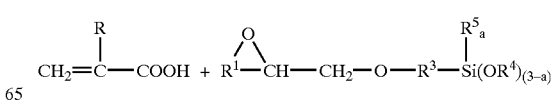

wherein R, $R^1$, $R^3$, $R^4$, and a are as defined above.

Generally, the acid has the structural formula:

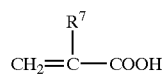

II where $R^7$ is a radical selected from the group of hydrogen and lower alkyl of 1 to 4 carbon atoms. Desirably $R^7$ is $CH_3$.

The above-mentioned acid is reacted with an epoxidized polyalkoxysilane to yield structural formula I. Glycidoxypropylalkoxysilanes are the epoxidized polyalkoxysilanes most desired in this embodiment, although others may be employed. Particularly desirable glycidoxypropyltrialkoxysilanes include but are not limited to glycidoxybutyltrimethoxysilane and structure III below:

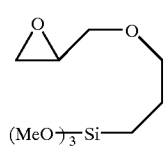

III

Epoxidized polyalkoxysilanes having dialkoxy functionality are also contemplated. For example, (glycidoxypropyl) methyldiisopropenoxysilane, (3-glycidoxypropyl) methyldimethoxysilane and (glycidoxypropyl) methyldiethoxysilane are useful dialkoxy components.

In yet, another preferred embodiment, a moisture and radiation (e.g., UV) curable composition includes the reaction product of (meth)acrylic and an epoxidized polyalkoxysilane (described above) and a diisocyanate as described below.

Desirably, the diisocyanates useful in the present invention are isocyanate end-capped prepolymer having structural formula IV:

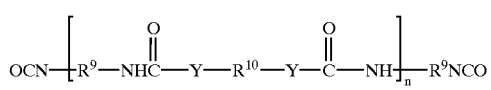

IV wherein $R^9$ and $R^{10}$ may be the same or different, and may be a divalent substituted or unsubstituted aliphatic, cycloaliphatic or aromatic radical or a polyol, polyester, or a polyalkylidene radical, Y is O or NH and n is an integer from 1 to 100.

Desirably, $R^{10}$ is a polymeric backbone which may include a polyester polyol radical, a polyether polyol radical, a polyhydroxy polycarbonate radical or combinations thereof.

Even more desirably, $R^{10}$ is a diradical formed from hydroxy terminated polypropyleneoxide diol, and $R^9$ is a diradical formed from isophorone diisocyanate.

The average molecular weight of the isocyanate may vary depending on the extended use and desired properties to be imparted to products formed upon further reaction with the compounds having structural formula I. For example, useful isocyanates may have molecular weights of about 200 to about 10,000, desirably 800 to about 8000 and more desirably 1800 to about 8,000.

Yet, even more desirably, $R^{10}$ is a diradical formed from hydroxy-terminated polypropyleneoxide diol with an average molecular weight of about 2200 and $R^9$ is a diradical formed from isophorone diisocyanate.

In accordance with the present invention, the term diisocyanate also includes NCO semi-prepolymers which contain unreacted starting diisocyanates in addition to the urethane group or urea group containing prepolymers.

Particularly useful diisocyanates (IV) are those formed by reacting an OH-terminated organic compound with a diisocyanate as shown in to EQ. 3 to form an isocyanate-terminated urethane.

EQ. 3

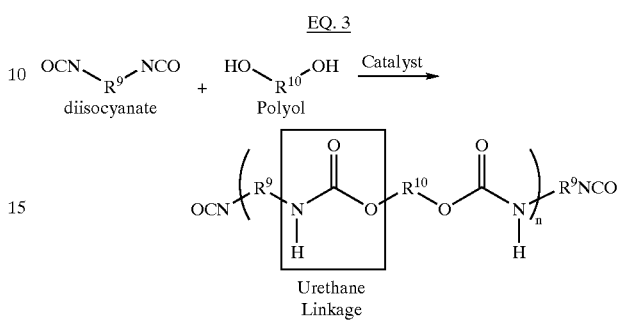

Urethane Linkage wherein $R^9$ and $R^{10}$ are as described above and n is an integer from 1–100.

Examples of high molecular weight OH-containing organic compounds useful in the present invention include polyester polyols, polyether polyols, polyhydroxy polycarbonates, polyhydroxy polyacetals, polyhydroxy polyacrylates, polyhydroxy polyester amides, and polyhydroxy polythioethers. Polyester polyols, polyether polyols and polyhydroxy polycarbonates are particularly desirable. Polypropyleneoxide diols having average molecular weights of about 1,000 to about 18,000 are particularly useful. The molecular weights are number average molecular weights (Mn) and are determined by end group analysis (OH number).

In another embodiment, the diisocyanates having structural formula IV may be prepared by reacting a diisocyanate with a polyamine compound resulting in a isocyanate-terminated polyurea as depicted in EQ. 4 below:

EQ. 4

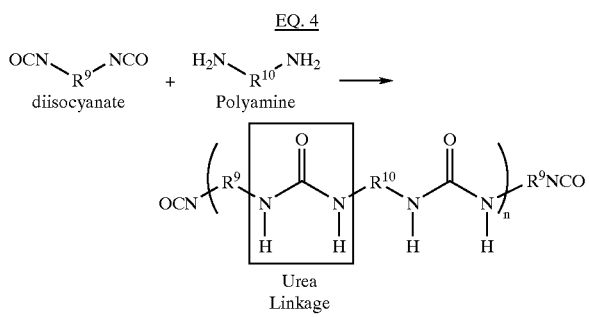

Urea Linkage wherein $R^9$ and $R^{10}$ are as described herein and n is from 1–100.

High molecular weight polyamines useful in the formation of the isocyanate-terminate polyureas, may be prepared by converting the terminal hydroxyl groups of the polyols previously described to amino groups. Additionally, the high molecular weight polyaspartates and polyaldimines disclosed in U.S. Pat. Nos. 5,243,012 and 5,466,771, respectively, are also useful and are herein incorporated by reference.

In addition to both radiation and moisture curing groups, the compositions of the present invention may include urea and urethane linkages in the polymer backbone, which import unique characteristics to the cured compositions.

Other diisocyanates particularly useful in the present invention include those having the general structural formula:

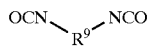

V wherein $R^9$ is as described above and most desirably represents an aromatic group, or a divalent aliphatic hydrocarbon group $C_{4-40}$, and, desirably $C_{4-18}$. $R^9$ may also be a divalent araliphatic $C_{7-15}$ hydrocarbon or a divalent cycloaliphatic $C_{5-15}$ hydrocarbon. Particularly desired organic diisocyanates include 1,6-hexamethylene diisocyanate, 1-isocyanato-3-isocyanatomethyl-3,5,5-trimethyl-cyclohexane (isophorone diisocyanate or IPDI), bis-4-isocyananto-cyclohexyl)-methane and 1-isocyanto-1-methyl-4(3)-isocyanatomethyl cyclohexane, 4,4'-methylenediphenyl diisocyanate (MDI) and 2,4-, 2,6-toluene diisocyanate (TDI), and 1,5-naphthalene diisocyanate (NDI).

Isophorone diisocyanate is the most particularly desired diisocyanate having the formula:

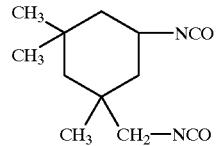

Structural formula IV desirably has an isocyanate content of 0.3 to 35% by weight; more desirably 0.6 to 25% by weight and most desirably 1.2 to 20% by weight. Compounds having the general structural formula IV may be produced by reacting the diisocyanates with the polyol component at a temperature of 40° C. to 120° C., preferably 50 to 100° C., at an NCO/OH or NCO/NH equivalent ratio of 1.3:1 to 20:1, preferably 1.4:1 to 10:1.

If chain extension via urethane or urea groups is desired during the preparation of the isocyanate prepolymers, an NCO/OH or NCO/NH equivalent ratio of 1.3:1 to 2:1 is selected. Desirable chain extenders include but are not limited to 1,4-butandiol, 1,6-hexanediol, ethylene glycol, ethylene diamine and 4,4'-methylene bis(2-chloroaniline), hydrogenated bis phenol-A, tricyclodecane dimethanol and the like.

If chain extension is not desired, an excess of diisocyanate is may be used, corresponding to an NCO/OH or NCO/NH equivalent ratio of 4:1 to 20:1 desirably 5:1 to 10:1. The excess diisocyanate may optionally be removed by thin layer distillation when the reaction is completed.

The compositions of the invention may further include a curing system. A curing system includes but is not limited to catalysts, photoinitiators or other reagents which act to accelerate or otherwise promote the curing of the composition of the invention.

The compositions of the invention can be cured by a curing mechanism such as subjecting it to UV light. The compositions can be spread on a surface to the desired thickness, e.g., 1 mil (0.0254 mm) to 25 mil (0.635), and then subjected to UV light, for a short time, e.g., one second to several minutes. The actual length of irradiation will depend on a number of factors, such as the distance from and the intensity of the source of irradiation, the specific monomers employed and the ratio of such monomers to each other, the presence or absence of additional co-monomers and the nature and the amount of the photoinitiator employed. The type of photoinitiator employed will depend at least in part on the type of UV, irradiation employed (particularly its wavelength) since various photoinitiators may be decomposed by UV light of different wavelengths.

In order to effect quick and efficient polymerization under UV light, 0.01 to 5 weight percent of a photoinitiator, preferably 0.15 to 5 percent and more preferably 0.2 to 1.0 weight percent, may be incorporated into the composition of the invention. Any compound which dissociates into free radicals when exposed to UV radiation can be employed.

Such compounds include photoinitiators and/or certain metallocenes, including but not limited to IRGACURE 784DC, that may serve a dual purpose as both metallocene and photoinitiator.

Examples of other suitable photoinitiators for use or inclusion in the compositions of the invention include, but are not limited to, photoinitiators available commercially from Ciba Specialty Chemicals, under the IRGACURE and DAROCUR trade names, specifically IRGACURE 184 (1-hydroxycyclohexyl phenyl ketone), 907 (2-methyl-1-[4-(methylthio)phenyl1]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl)phosphine oxide and 2-hydroxy-2-methyl-1-phenyl-propan-1 one), and 819 [bis(2,4,6-trimethyl benzoyl)phenyl phosphine oxide] and DAROCUR 1173 (2-hydroxy-2-methyl-1-phenyl-1-propan-1-one) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and IRGACURE 784DC. Of course, combinations of these materials may also be employed herein.

Other photoinitiators useful herein include alkyl pyruvates, such as methyl, ethyl, propyl, and butyl pyruvates, and aryl pyruvates such as phenyl, benzyl, and appropriately substituted derivatives thereof. Photoinitiators particularly well-suited for use herein include ultraviolet photoinitiators, such as 2,2-dimethoxy-2-phenyl acetophenone (e.g., IRGACURE 651), and 2-hydroxy-2-methyl-1-phenyl-1-propane (e.g., DAROCUR 1173), bis(2,4,6-trimethyl benzoyl)phenyl phosphine oxide (e.g., IRGACURE 819), and the ultraviolet/visible photoinitiator combination of bis(2,6-dimethoxybenzoyl-2,4,4-trimethylpentyl)phosphine oxide and 2-hydroxy-2-methyl-1-phenyl-propan-1-one (e.g., IRGACURE 1700), as well as the visible photoinitiator bis($n^5$-2,4-cyclopentadien-1-yl)-bis[2,6-difluoro-3-(1H-pyrrol-1-yl)phenyl]titanium (e.g., IRGACURE 784DC). Desirably, diethoxyacetophenone is used.

The compositions of the invention are designed primarily as a radiation curing product, however, due to the configuration of many substrates there are shadow areas that cannot be cured by radiation. To overcome this deficiency, a second curing mechanism has been built into the composition of the invention. More specifically, after exposure to radiation, a built-in moisture cure mechanism is available to complete curing of uncured areas of, for example, coating and potting.

In another embodiment of the instant invention, the compositions may be cured by moisture cure alone into a low modulus elastomer. The compositions of the present invention may be cured in the presence of water or moisture to form coatings, structural adhesives, potting compounds or sealants.

Suitable catalysts may be used to promote the curing reaction. Examples include acids such as paratoluene sulfonic acid, metalalkoxides such as dibutyl tin dilaurate, isopropyltitanate, tertiary amines such as triethylamine or triethylene diamine and mixtures of these catalysts. Low molecular weight, basic aminoalky trialkoxysilanes also accelerate hardening of the compounds according to the invention. Desirably, metalalkoxides are used.

The compositions may also contain known additives such as leveling agents, wetting agents, flow control agents, antiskinning agents antifoaming agents, fillers (such as silica, aluminum silicates and high-boiling waxes), viscosity regulators plasticizers, pigments, dyes, UV absorbers and stabilizers against thermal and oxidative degradation.

The compositions may be applied to any desired substrates such as wood, plastics, leather, paper, textiles, glass, ceramics, plaster masonry, metals and concrete. They may be applied by standard methods, such as spray coating, spread coating, flood coating, casting, dip coating, roll coating.

The curable compositions may be cured at ambient temperature or at elevated temperatures. Desirably, the dual curable compositions are cured at ambient temperatures.

Also provided herein is a method of producing a radiation and moisture curable composition. The method comprises providing a compound with structural formula I as described above and reacting the compound with a diisocyanate.

Desirably, $R^1$ is a methylene linkage, $R^2$ is O, $R^3$ is propylene and $R^4$ is methyl for structural formula I in the method of the invention. In an alternative, desirable embodiment, $R^1$ is a methylene linkage, Q is $N(R^2)$, $R^2$ is H, $R^3$ is propylene and $R^4$ is methyl for structural formula 1. Desirably, the diisocyanate is structural formula IV.

The composition is prepared by reacting structures I and IV at elevated temperature, desirably between about 50° C. and about 100° C., more desirably between about 65° C. and 80° C., even more desirably between about 68° C. and 78° C., and most desirably at about 75° C. The reaction mixture may proceed for about one hour. Optionally, additional structural formula I may be added to the reaction which may be allowed to proceed for an additional amount of time, typically between one and six hours.

Additionally, the invention provides a bond including the reaction product of structural formula I and a diisocyanate after exposing the composition to conditions suitable to effectuate a cure including, but not limited to, moisture, UV or combinations thereof. The composition may be cured, optionally, in the presence of an appropriate curing system as described above.

A method of forming a bond is also provided. In this aspect of the invention, a composition including the reaction product of structural formula I and a diisocyanate as described hereinabove is applied onto the surface of a substrate and this composition is allowed to cure by exposing it to moisture, UV or a combination of these curing mechanisms. An appropriate curing system as is known in the art and described herein may optionally be added to the reaction product before application to the substrate of interest.

In addition, the invention provides a method of using compositions including the reaction product of structural formula I and a diisocyanate as described hereinabove, to bond together two substrates. The steps of this method includes applying the composition to a surface of one of the substrates and then mating the other substrate therewith.

The amount of photo/moisture curable composition provided should be sufficient to cure and form an adequate bond to the substrate surfaces between which it is applied. For instance, application of the compositions of the invention may be achieved by dispensing the composition in dropwise fashion, or as a liquid stream, brush-applied, dipping and the like to form a thin film. Application of the inventive composition may depend on the flowability or viscosity of the composition. To this end, viscosity modifiers, as are well known in the art may be included in the composition.

In use, the inventive compositions are desirably readily dispensed onto a portion of a desired surface of a substrate onto which is to be bonded a portion of another substrate. The inventive compositions may be applied to certain portions of the substrate surface or over the entire surface of the substrate to be bonded, depending on the particular application. The composition applied substrate is then exposed to a curing mechanism or combinations thereof, and optionally a curing system as described herein.

In another aspect of the invention, an assembly is provided. The assembly includes the reaction product of structural formula I and an diisocyanate as described herein. The reaction product is disposed upon a first substrate. A second substrate is then mated to the first substrate. Desirably, at least one of the substrates in the assembly is exposed to a curing mechanism or combination thereof. Such exposure of at least one substrate of the assembly for an appropriate period of tine should transform the inventive composition into an adhesive reaction product. Optionally, a curing system may be added to the reaction product as described above. In an alternative embodiment, the reaction product is disposed between the substrates to form a mated assembly and then subjected to a curing mechanism as described.

Typical applications for using the compositions of the invention include but are not limited those including bonding tips on catheters and optical scopes and sealing large devices such as heat exchangers and blood oxygenators.

EXAMPLES

Example 1

A. Preparation of Structural Formula I Using an Epoxy Functional Acrylic Monomer and an Alkylaminoalkylene Polyalkoxysilane.

A 100 mL round bottom flask was charged with 36.47 g of ethylaminoisobutyltrimethoxysilane (0.165 mole), 21.30 g of glycidyl methacrylate (0.15 mole) and 0.12 g of MEHQ. The mixture was heated at 100° C. under a closed system with stirring for 3 hours. GC analysis of the mixture indicated only small amounts of the reactants were left. Small amounts of methanol and methylmethacrylate were also present. Proton NMR was consistent with the structure of the ring opened alcohol.

B. Preparation of Structural Formula IV Using a 6300 Molecular Weight Polyol and Formation of the Reaction Product of Structural formulas I and Structural formula IV.

A 500 mL 3-neck round bottom flask was charged with 153.8 g of an OH-terminated polypropyleneoxidepolyol (Acclaim 6300 from ARCO; OH content 27.5 mgKOH/g), 18.11 g of isophorone diisocyanate and 0.12 g of dibutyltin dilaurate. The mixture was heated at 75° C. for one hour with stirring. The disappearance of the OH and the formation of the urethane was monitored by IR. To the reaction mixture was then added 25.05 g of the capper prepared in (A). The mixture was further reacted at 75° C. for another hour. IR indicated only small amount of isocyanate present in the mixture. Another 2.00 g of the capper was further added and the reaction was run for another hour.

UV-Moisture Cure of the Composition of the Invention:

To the above reaction mixture described in Example 1(B) was added 1% by weight of diethoxyacetophenone. The formulation was then subjected for UV cure by casting as 75 mil films and irradiated with medium pressure mercury vapor lamp at the intensity of 70 mw/cm2 for one minute per side. The immediately cured films as well as films stored under ambient conditions one week after UV cure were each subjected to physical property testing using Instron.

Separately, the resin prepared in (B) without the added diethoxyacetophenone was also poured into a 75 mil mold and stored under ambient conditions for one week was also subjected to Instron testings. The results are shown in Table 1.

TABLE 1

|  | Freshly UV Cured | 1 Week After UV Cure | 1 Week Moisture Only |
| --- | --- | --- | --- |
| Appearance | Pale yellow | Pale yellow | Clear |
| Tensile (psi) | 108 | 212 | 75 |
| 50% modulus (psi) | 62 | 136 | 8 |
| % elongation | 90 | 73 | 380 |

Example 2

A. Preparation of Structural Formula IV Using a 2200 Molecular Weight Polyol and Formation of the Reaction Product of Structural Formula I and Structural Formula IV.

The capper prepared in Example 1(A) was similarly reacted with an isocyanate prepolymer of Acclaim 2200 as follows:

A 500 mL 3-neck round bottom flask was charged with 100 g of an OH-terminated polypropyleneoxidepolyol (Acclaim 2200 from ARCO; OH content: 57.1 mgKOH/g), 22.2 g of isophorone diisocyanate and 0.16 g of dibutyltin dilaurate. The mixture was heated at 75° C. for 1 hour with stirring. The disappearance of the OH and the formation of the urethane was monitored by IR. To the reaction mixture was then added 44.36 g of the capper prepared according to the procedure described in (A). The mixture was further reacted at 75° C. for another hour. IR indicated no isocyanate left.

The mixture was UV and moisture cured as described in Example 1. Moisture cure only was extremely slow. In one week, mixture only cured to a soft gel. No physical properties were measured. The freshly UV cured films as well as films stored one week after UV were subjected to Instron testings and the results are shown below:

TABLE 2

|  | Freshly UV Cured | 1 Week After UV Cure |
| --- | --- | --- |
| Appearance | Pale yellow | Pale Yellow |
| Tensile (psi) | 100 | 246 |
| 50% modulus (psi) | 78 | — |
| % elongation | 57 | 17 |

Example 3

A. Preparation of Structural Formula I by Reacting (Meth)Acrylic Acid with an Epoxidized Polyalkoxysilane.

A 100 mL round bottom flask was charged with 0.81 g of triphenylphosphine, 0.40 g of MEHQ, 28.08 g of glycidoxypropyltrimethoxysilane and 12.38 g of methacrylic acid. The mixture was heated at 90° C. under closed system with stirring for four hours. GC analysis of the mixture indicated only small amounts of the reactants left. Small amounts of methanol and methyl methacrylate were also present.

B. Preparation of the Reaction Product of Structural Formula I and Structural Formula IV.

A 500 mL 3-neck round bottom flask was charged with 100 g of an OH-terminated polypropyleneoxidepolyol (Acclaim 2200 from ARCO OH content: 57.1 mgKOH/g), 22.2 g of isophorone diisocyanate and 0.15 g of dibutyltin dilaurate. The mixture was heated at 75° C. for one hour with stirring. The disappearance of the OH and the, formation of the urethane was monitored by IR. To the reaction mixture was then added 41.66 g of the capper prepared according to the procedure described in Example 2(A). To the mixture was further added another portion of 0.15 g dibutyltin dilaurate. The mixture was further reacted at 75° C. for four more hours. IR indicated small amount of isocyanate was still present. Another portion of 0.20 g of dibutyltin dilaurate was further added and the reaction was run for another hour. GC indicated only trace isocyanate was present.

The mixture was UV and moisture cured as described in Example 1. Moisture cure only was extremely slow. In one week, mixture only cured to a soft gel. No physical properties were measured. The freshly cured UV cured films as well as films stored one week after UV were subjected to Isntron testings and the results are shown below:

TABLE 3

|  | Freshly UV Cured | 1 Week After UV Cure |
| --- | --- | --- |
| Appearance | Pale yellow | Pale Yellow |
| Tensile (psi) | 87 | 140 |
| % elongation | 21 | 15 |

The above three examples showed that an initially radiation curable formulation can be prepared from either the amine route or the acid route described above. Upon further secondary moisture curing, the initially formed elastomer further tightened its, crosslinking network leading to the increase of tensile strengths as well as the increase of the moduli. As a consequence of such tightening, the % elongation decreased. Gellation of the formulations by moisture cure only further demonstrated the progress of crosslinking. When higher, molecular weight of polypropyleneoxidepolyol. (e.g., Acclaim 6300) was used, the formulation cured by moisture alone into a low modulus elastomer.

What is claimed is:

1. A radiation and moisture curable composition comprising:

(a) a compound within structural formula I:

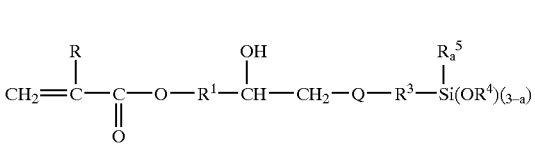

where R is H or a monovalent substituted or unsubstituted $C_{1-6}$ hydrocarbon radical;

Q is S, O or $N(R^2)$;

$R^1$ comprises a divalent substituted or unsubstituted $C_{1-12}$ aliphatic, cycloaliphatic or aromatic hydrocarbon radical, which may be interrupted with a heteroatom-containing linkage;

$R^2$ is H or a monovalent substituted or unsubstituted $C_{1-6}$ hydrocarbon radical;

$R^3$ comprises a divalent substituted or unsubstituted $C_{1-20}$ aliphatic, cycloaliphatic or aromatic hydrocarbon radical, which may be interrupted with a heteroatom-containing linkage; and $R^4$ and $R^5$ may each independently be a monovalent substituted or unsubstituted $C_{1-6}$ hydrocarbon radical; a is 0 or 1; and (b) a diisocyanate.

2. The composition of claim 1, wherein $R^1$ is methylene or a methylenoxy alkylene $C_{1-6}$ linkage.

3. The composition of claim 1, further comprising a cure system.

4. The composition of claim 1 wherein the diisocyanate is an isocyanate end-capped prepolymer having the structural formula IV:

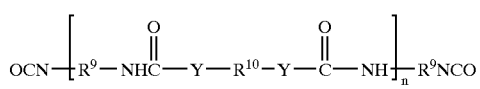

IV wherein $R^9$ and $R^{10}$ may be the same or different, and may be a divalent substituted or unsubstituted aliphatic, cycloaliphatic or aromatic radical or a polyol, polyester, or a polyalkylidene radical; Y is O or NH; and n is an integer from 1 to 100.

5. The composition of claim 4, wherein $R^{10}$ is polymeric backbone is selected from a group consisting of polyester polyols, polyether polyols and polyhydroxy polycarbonates.

6. The composition of claim 1, wherein $R^1$ is methyl, Q is oxygen, $R^3$ is propylene, and $R^4$ is methyl.

7. The composition of claim 1, wherein $R^1$ is methyl, Q is $NR^2$, $R^2$ is ethyl, $R^3$ is propylene and $R^4$ is methyl.

8. The composition of claim 4, wherein $R^9$ is a diradical formed from isophorone diisocyanate, and $R^{10}$ is a diradical formed from hydroxy terminated polypropyleneoxide diol.

9. The composition of claim 4, wherein $R^9$ is a diradical formed from isophorone diisocyanate and $R^{10}$ is a diradical formed from hydroxy terminated polypropyleneoxide-polyol.

10. The composition of claim 3, where the curing system is selected from the group consisting of 1-hydroxycyclohexyl phenyl ketone, 2-methyl-1-[4-(methylthio)phenyl1]-2-morpholino propan-1-one, 2-benzyl-2-N,N-dimethylamino-1-(4-morpholinophenyl)-1-butanone, the combination of 1-hydroxy cyclohexyl phenyl ketone and benzophenone, 2,2-dimethoxy-2-phenyl acetophenone, the combination of bis(2,6-dimethoxybenzoyl-2,4,4-trimethyl pentyl) phosphine oxide and 2-hydroxy-2-methyl-1-phenyl-propan-1-one, and [bis (2,4,6-trimethyl benzoyl)phenyl phosphine oxide], 2-hydroxy-2-methyl-1-phenyl-1-propan-1-one, the combination of 2,4,6-trimethylbenzoyldiphenyl-phosphine oxide and 2-hydroxy-2-methyl-1-phenyl-propan-1-one, dl-camphorquinone, alkyl pyruvates, 2,2-dimethoxy-2-phenyl acetophenone, 2-hydroxy-2-methyl-1-phenyl-1-propane, bis(2,4,6-trimethyl benzoyl)phenyl phosphine oxide, bis(2,6-dimethoxybenzoyl-2,4,4-trimethylpentyl) phosphine oxide, 2-hydroxy-2-methyl-1-phenyl-propan-1-one, bis($n^5$-2,4-cyclopentadien-1-yl)-bis[2,6-difluoro-3-(1H-pyrrol-1-yl)phenyl]titanium, diethoxyacetophenone and combinations thereof.

11. The composition of claim 3, where the curing system includes a moisture curing catalyst.

12. A composition comprising the reaction product of:
(a) a compound within the structural formula I:

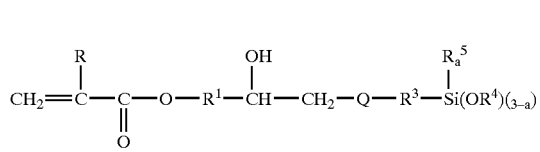

I where R is H or a monovalent substituted or unsubstituted $C_{1-6}$ hydrocarbon radical;

Q comprises S, O or $N(R^2)$;

$R^1$ comprises a divalent substituted or unsubstituted $C_{1-12}$ aliphatic, cycloaliphatic or aromatic hydrocarbon radical, which may be interrupted with a heteroatom-containing linkage;

$R^2$ is H or a monovalent substituted or unsubstituted $C_{1-6}$ hydrocarbon radical;

$R^3$ comprises a divalent substituted or unsubstituted $C_{1-20}$ aliphatic, cycloaliphatic or aromatic hydrocarbon radical, which may be interrupted with a heteroatom-containing linkage; and $R^4$ and $R^5$ may each independently be a monovalent substituted or unsubstituted $C_{1-6}$ hydrocarbon radical; a is 0 or 1; and (b) a diisocyanate.

13. The composition of claim 12, further comprising a curing system.

14. The composition of claim 13, where the curing system is selected from the group consisting of 1-hydroxycyclohexyl phenyl ketone, 2-methyl-1-[4-(methylthio)phenyl1]-2-morpholino propan-1-one, 2-benzyl-2-N,N-dimethylamino-1-(4-morpholinophenyl)-1-butanone, the combination of 1-hydroxy cyclohexyl phenyl ketone and benzophenone, 2,2-dimethoxy-2-phenyl acetophenone, the combination of bis(2,6-dimethoxybenzoyl-2,4,4-trimethyl pentyl) phosphine oxide and 2-hydroxy-2-methyl-1-phenyl-propan-1-one, and [bis (2,4,6-trimethyl benzoyl)phenyl phosphine oxide], 2-hydroxy-2-methyl-1-phenyl-1-propan-1-one, the combination of 2,4,6-trimethylbenzoyldiphenyl-phosphine oxide and 2-hydroxy-2-methyl-1-phenyl-propan-1-one, dl-camphorquinone, alkyl pyruvates, 2,2-dimethoxy-2-phenyl acetophenone, 2-hydroxy-2-methyl-1-phenyl-1-propane, bis(2,4,6-trimethyl benzoyl)phenyl phosphine oxide, bis(2,6-dimethoxybenzoyl-2,4,4-trimethylpentyl) phosphine oxide, 2-hydroxy-2-methyl-1-phenyl-propan-1-one, bis($n^5$-2,4-cyclopentadien-1-yl)-bis[2,6-difluoro-3-(1H-pyrrol-1-yl)phenyl]titanium, diethoxyacetophenone and combinations thereof.

15. The composition of claim 13, where the curing system comprises a moisture curing catalyst.

16. A composition comprising the reaction product of:
(i) the reaction product of an epoxidized (meth)acrylate and an alkylaminoalkylene polyalkoxysilane; and
(ii) a diisocyanate-containing compound or prepolymer.

17. A composition comprising the reaction product of:
(i) the reaction product of (meth)acrylic acid and epoxidized polyalkoxysilane; and
(ii) a diisocyanate-containing compound or prepolymer.

18. A method of producing a radiation and moisture curable composition comprising:

(a) providing a compound with the structural formula I:

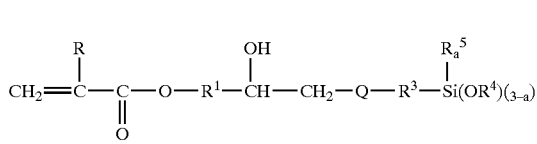

I where R is H or a monovalent substituted or unsubstituted $C_{1-6}$ hydrocarbon radical;
Q is S, O or $N(R^2)$;
$R^1$ comprises a divalent substituted or unsubstituted $C_{1-12}$ aliphatic, cycloaliphatic or aromatic hydrocarbon radical, which may be interrupted with a heteroatom-containing linkage;
$R^2$ is H or a monovalent substituted or unsubstituted $C_{1-6}$ hydrocarbon radical;
$R^3$ comprises a divalent substituted or unsubstituted $C_{1-20}$ aliphatic, cycloaliphatic or aromatic hydrocarbon radical, which may be interrupted with a heteroatom-containing linkage; and
$R^4$ and $R^5$ may each independently be a monovalent substituted or unsubstituted $C_{1-6}$ hydrocarbon radical; a is 0 or 1; and
(b) reacting the compound with a diisocyanate compound.

19. The method of claim 18, wherein in Compound I, R is H or $CH_3$;
$R^1$ is a methylene linkage;
Q is O;
$R^3$ is propylene; and
$R^4$ is methyl.

20. The method of claim 18, wherein R is H or $CH_3$;
$R^1$ is a methylene linkage;
Q is $N(R^2)$;
$R^2$ is H;
$R^3$ is propylene; and
$R^4$ is methyl.

21. The method of claim 18, wherein the diisocyanate compound is an end-capped prepolymer having the structural formula IV:

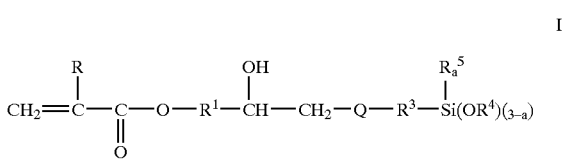

IV wherein $R^9$ and $R^{10}$ may be the same or different, and may be a divalent substituted or unsubstituted aliphatic, cycloaliphatic or aromatic radical or a polyol, polyester, or a polyalkylidene radical; Y is O or NH; and n is an integer from 1 to 100.

22. A method of using a composition having a reaction product of

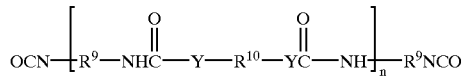

I where R is H or a monovalent substituted or unsubstituted $C_{1-6}$ hydrocarbon radical;

Q is S, O or $N(R^2)$;
$R^1$ comprises a divalent substituted or unsubstituted $C_{1-12}$ aliphatic, cycloaliphatic or aromatic hydrocarbon radical, which may be interrupted with a heteroatom-containing linkage;
$R^2$ is H or a monovalent substituted or unsubstituted $C_{1-6}$ hydrocarbon radical1;
$R^3$ comprises a divalent substituted or unsubstituted $C_{1-20}$ aliphatic, cycloaliphatic or aromatic hydrocarbon radical, which may be interrupted with a heteroatom-containing linkage;
$R^4$ is a monovalent substituted or unsubstituted $C_{1-6}$ hydrocarbon radical and a diisocyanante, said method comprising the steps of:
a) applying the composition onto a surface of a substrate; and
b) subjecting the composition-applied substrate to a curing mechanism to produce the reaction product.

23. A method of forming a bond comprising the steps of
a) applying a composition having the reaction product of

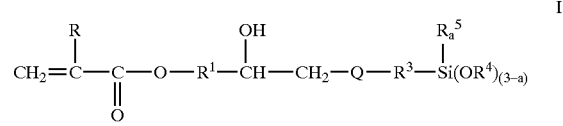

I where R is H or a monovalent substituted or unsubstituted $C_{1-6}$ hydrocarbon radical;
Q is S, or $N(R^2)$;
$R^1$ comprises a divalent substituted or unsubstituted $C_{1-12}$ aliphatic, cycloaliphatic or aromatic hydrocarbon radical, which may be interrupted with a heteroatom-containing linkage;
$R^2$ is H or a monovalent substituted or unsubstituted $C_{1-6}$ hydrocarbon radical;
$R^3$ comprises a divalent substituted or unsubstituted $C_{1-20}$ aliphatic, cycloaliphatic or aromatic hydrocarbon radical, which may be interrupted with a heteroatom-containing linkage;
$R^4$ is a monovalent substituted or unsubstituted $C_{1-6}$ hydrocarbon radical and a diisocyanate onto a surface of a substrate; and
b) subjecting said composition to conditions suitable to effectuate cure.

24. A bond comprising a cured composition, wherein said cured composition comprises the reaction product of
a)

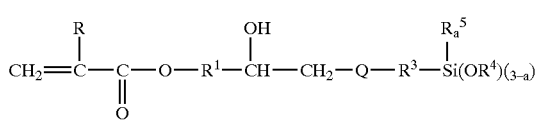

I where R is H or a monovalent substituted or unsubstituted $C_{1-6}$ hydrocarbon radical;
Q is S, O or $N(R^2)$;
$R^1$ comprises a divalent substituted or unsubstituted $C_{1-12}$ aliphatic, cycloaliphatic or aromatic radical which may be interrupted with a heteroatom containing linkage;
$R^2$ is H or a monovalent substituted or unsubstituted $C_{1-6}$ hydrocarbon radical;

$R^3$ comprises a divalent substituted or unsubstituted $C_{1-20}$ aliphatic, cycloaliphatic or, aromatic hydrocarbon radical, which may be interrupted with a heteroatom-containing linkage;

$R^4$ is a monovalent substituted or unsubstituted $C_{1-6}$ hydrocarbon radical and b) a diisocyanate.

25. An assembly comprising:

a) a composition comprising the reaction product of a)

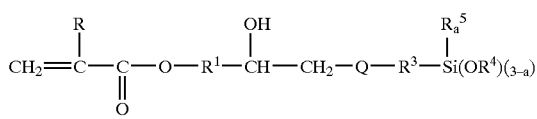

I where R is H or a monovalent substituted or unsubstituted $C_{1-6}$ hydrocarbon radical;

Q is S, O or $N(R^2)$;

$R^1$ comprises a divalent substituted or unsubstituted $C_{1-12}$ aliphatic, cycloaliphatic or aromatic hydrocarbon radical, which may be interrupted with a heteroatom-containing linkage;

$R^2$ is H or a monovalent substituted or unsubstituted $C_{1-6}$ hydrocarbon radical;

$R^3$ comprises a divalent substituted or unsubstituted $C_{1-20}$ aliphatic, cycloaliphatic or aromatic hydrocarbon radical, which may be interrupted with a heteroatom-containing linkage;

$R^4$ is a monovalent substituted or unsubstituted $C_{1-6}$ hydrocarbon radical, and b) a diisocyanate, said composition being disposed between two substrates to form a mated assembly; and c) a second substrate mated to said first substrate, thus forming an assembly.

* * * * *